United States Patent [19]

Becker et al.

[11] 4,311,215
[45] Jan. 19, 1982

[54] BRAKE FOR A SLIDE COASTER SLED

[75] Inventors: Klaus Becker, Wetter; Karlheinz Wolski, Bochum, both of Fed. Rep. of Germany

[73] Assignee: Mannesmann DeMag AG, Duisburg, Fed. Rep. of Germany

[21] Appl. No.: 105,755

[22] Filed: Dec. 20, 1979

[30] Foreign Application Priority Data

Jan. 18, 1979 [DE] Fed. Rep. of Germany ....... 2901755

[51] Int. Cl.³ .............................................. B62B 17/08
[52] U.S. Cl. .......................................... 188/8; 280/11; 280/12 AB
[58] Field of Search ................ 188/5, 8, 73.1; 280/11, 280/12 AB

[56] References Cited

U.S. PATENT DOCUMENTS

| 862,414 | 8/1907 | Roberts | 188/5 |
|---|---|---|---|
| 2,105,308 | 1/1938 | Brickner . | |
| 2,113,056 | 4/1938 | McKinnon | 188/5 |
| 2,871,986 | 2/1959 | Polovitch | 188/5 |
| 3,858,517 | 1/1975 | Luck et al. | 188/8 X |
| 3,973,785 | 8/1976 | Becker et al. | 280/11 |

FOREIGN PATENT DOCUMENTS

| 36787 | 3/1909 | Austria . |
|---|---|---|
| 2303378 | 8/1974 | Fed. Rep. of Germany . |
| 2742141 | 3/1979 | Fed. Rep. of Germany . |
| 50640 | 3/1910 | Switzerland . |

Primary Examiner—Jeffrey V. Nase
Attorney, Agent, or Firm—Mandeville and Schweitzer

[57] ABSTRACT

A brake surface is provided for slide coaster sleds in which the brake surface is configured to be an elongated surface of much greater length relative to the width. The braking surface is particularly useful for use on wet slide surfaces because the foremost sections of the brake surface remove the moisture at the brake-slide interface and dry the surface through frictional contact. Therefore, the following brake portions of about two-thirds of the length are available to bring about effective braking action. Preferably, the elongated brakes are formed in a U-shape in cross section with a central groove for containing moisture. Also, it is preferred to have two spaced apart brake surfaces positioned on opposite sides of the longitudinal center line of the sled.

10 Claims, 5 Drawing Figures

4,311,215

BRAKE FOR A SLIDE COASTER SLED

BACKGROUND AND STATEMENT OF THE INVENTION

The invention relates to a brake for a coaster sled for a slide with a hinged control lever to press down the brake surface supported on levers onto the slide surface.

The brake, according to German DE-PS 2 404 337 (U.S. Pat. No. 3,973,785) is not sufficiently effective on a moist slide. In front of and behind the seating area, the sled has approximately square brake surfaces of about 100 mm lateral length with diagonal channels to drain the water. The slide surface does not dry off anywhere before contact with the brake so that the brake cannot operate satisfactorily under wet conditions. This becomes especially noticeable when the slide, consisting of asbestos concrete, is waxed for maintenance, and to reduce frictional resistance. A safe brake, however, is indispensable on such slides, as an obstacle may suddenly appear, or someone may, for no apparent reason, stop and is then endangered by anyone following who is using the slide.

It is, therefore the object of the invention to provide a sled brake which is effective, even if the slide surface is wet. This is achieved by making the brake surface very long in relation to the width. A strip is formed of about 20 mm width and about 700 mm length. This causes removal in the front area of the water, and in the following area of the brake surface a drying of the slide due to the frictional heat. In the remainder of the length of brake surface, amounting to about two thirds of the length, the brake is fully effective. The center of gravity of the occupied sled is approximately in the center and above this effective area.

The brake, according to the invention, is much better than the one previously known which has a roughly square brake surface, even if the slide surface is frost-covered, due to the drying and heating effect. A still better drainage of the water, and thus greater efficiency of the brake, is achieved by a longitudinal groove in the brake surface. The brake surface is manufactured of a supple elastic material with a hardness of 50 shore, such as, for example, natural rubber.

Each brake surface is attached to a supporting bracket. The latter may consist of a U-shaped profile, or the brake surface on the side facing the supporting bracket may consist of a so-called dovetail. The supporting bracket is dovetail shaped accordingly. The brake surface may also be vulcanized onto the supporting bracket. In order to keep the brake out of the lower area of the trough-shaped slide where the water is deepest, preference is given to arranging two brake surfaces along the longitudinal slides of the sled, connected to each other via cross bars. The front bar leads through a control lever extension formed as a pivotal axis. Each of the two supporting brackets may be attached to connecting rods arranged between the front and rear levers of the sled.

DESCRIPTION OF THE DRAWINGS

Two examples of the invention are shown in the drawings, and explained as follows.

DETAILED DESCRIPTION OF THE INVENTION

Figure 1:
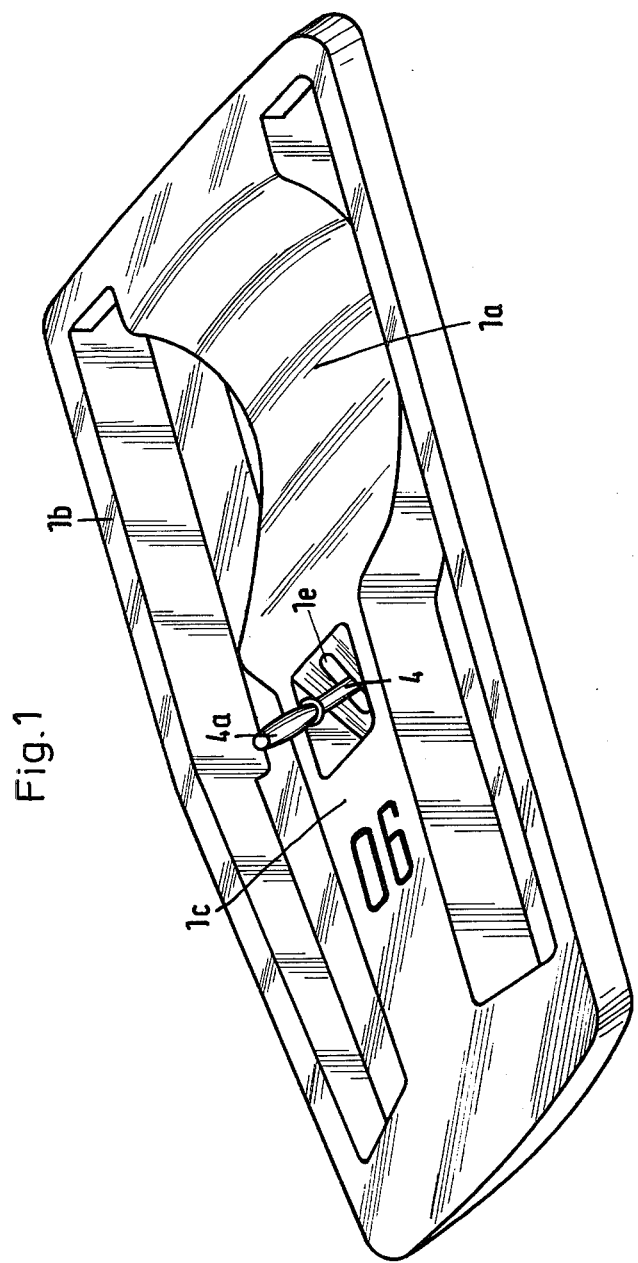
FIG. 1 is a perspective view of a sled illustrating the invention.
Figure 2:
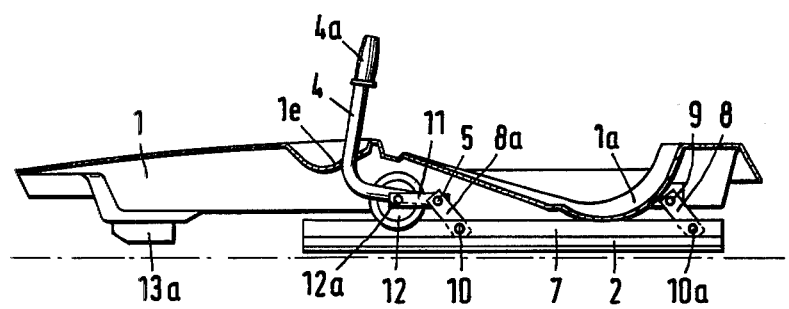
FIG. 2 is a longitudinal sectional view of the sled of FIG. 1.

The sled 1 shown in the drawings is formed of a roughly rectangular part with ridges 1b along the longitudinal sides and, between the sides a seating area 1a in the rear portion. This seating area 1a rises towards the front and merges with a central longitudinal ridge 1c extending all the way to the front of the sled. A slot 1e is present in front of the seating area 1a in the central longitudinal ridge 1c, through which the handle 4a of a control lever 4 projects. The latter pivots on an axis 5 below the handle 4a, as shown in FIG. 2. Lever extensions 8a of the control lever 4 to accommodate the front cross bar 10 extend beyond the axis 5. A rear cross bar 10a rests via a lever 8 on a torsional axis 9 behind the seating area 1a of the sled. The front and rear cross bars 10 and 10a are connected by their ends via a linkage 7, which extends past the front cross bar 10 in order to reinforce the brake surface 2.

The control lever 4 is connected, via the axis 5, with a pivotal lever arm 11 carrying the axes 12a of rollers 12. The rollers 12 do not have contact with the slide surface during ordinary sliding. They are operative after the control lever 4 has been pressed down to accelerate the sled, whereby its skids 13, visible in FIG. 3, on which the sled slides normally, are lifted off the slide surface with their front ends. Simultaneously, the front slide portions 13a are lifted off the track.

Figure 3:
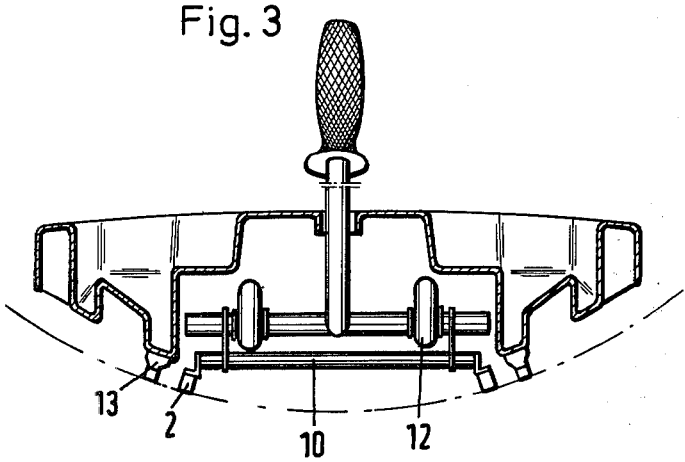
FIG. 3 is a cross sectional view of the sled of FIG. 1.

FIG. 3 is a cross section of the sled on a slide surface indicated in dot-dash lines. The brake surfaces 2 are arranged on the sled at an angle according to the slide surface shape. They safely decelerate the sled 1 when the control lever 4 is pulled up. The brake lever extensions are pressed down so that the front cross bar 10 and the connecting linkage 7 move down. The surfaces 2 engage the slide surface and decelerate the sled even if the slide is wet, since they are made of a sufficiently supple elastic material, such as natural rubber. If the brake lever 4 is not tightened, the surfaces 2 slide inactively over the slide surface, while the sled slides on the skids 13 with little frictional resistance.

Figure 4:
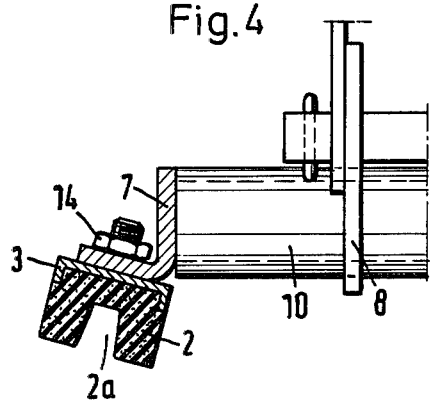
FIGS. 4 and 5 are cross sectional views of the brake surface and supporting brackets.
Figure 5:
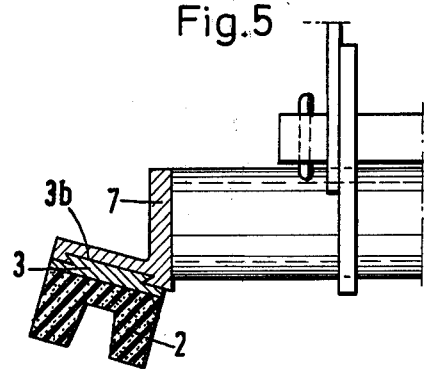

FIGS. 4 and 5 show the brake surfaces 2 provided with longitudinal grooves 2a in profile. According to FIG. 4 they may be glued into a U-shaped supporting bracket 3, or screwed to the latter. The screws 14 simultaneously serve to attach the supporting profile 3 to the connecting linkage 7.

The example shown in FIG. 5 shows the brake surface 2 being vulcanized to a supporting bracket 3 which extends and is supported along the connecting linkage 7 by means of a dovetail 3b. FIGS. 4 and 5 also show the arrangement of the cross bar 10 between the connecting linkage 7 and the mounting of the rear cross bar 10a via lever 8 on the sled.

By means of the low height of the material forming the brake surface, full contact is made during deceleration, even if the slide surface is not level, thus achieving a reliable result, although the respective brake surface is relatively long and narrow. If uneven wear of the brake surface material should occur, the U-shaped brake surfaces may be changed around, so that the original front end now becomes the rear end. This is done effortlessly due to the detachable arrangement of the supporting bracket 3 on the connecting linkage 7.

We claim:

1. A slide coaster sled which comprises:
   (a) an elongated sled body,
   (b) a seat on said body,
   (c) sled braking surfaces disposed on the bottom of said sled body,
   (d) said sled braking surfaces being elongated to extend along said body,
   (e) the length of said braking surfaces along the longitudinal axis of said sled being several times greater than the width of said braking surfaces,
   (f) said braking surfaces extending continuously in the longitudinal direction,
   (g) said braking surfaces being comprised of a supple elastic material,
   (h) said braking surfaces including two spaced apart longitudinally extending braking surfaces equilaterally spaced from the longitudinal center line of said body,
   (i) a front cross bar connecting said two braking surfaces together,
   (j) a rear cross bar connecting said two braking surfaces together,
   (k) a brake lever extending from said front cross bar to the top of said body,
   (l) an elongated braking surface support bracket mounted on said sled body for engaging said braking surfaces, and
   (m) longitudinal groove means disposed in said braking surfaces and extending the length thereof generally parallel to the longitudinal axis of said braking surfaces.

2. The apparatus of claim 1, further characterized in that
   (a) said width is about 20 millimeters; and
   (b) said length is about 700 millimeters.

3. The apparatus of claim 1, further characterized in that
   (a) the center of said braking surface length is below the location where an occupant of said sled would be seated.

4. The apparatus of claim 1, further characterized in that
   (a) the hardness of said supple elastic material is 50 shore.

5. The apparatus of claim 1, further characterized in that
   (a) said supple elastic material is natural rubber.

6. The apparatus of claim 1, further characterized in that
   (a) said braking surfaces are natural rubber and are vulcanized onto said support bracket.

7. The apparatus of claim 1, further characterized by
   (a) lever extensions extending between said brake lever and front cross bar.

8. The apparatus of claim 1, further characterized by
   (a) spaced secondary levers mounting said rear cross bar on each end thereof;
   (b) an elongated connecting linkage extending along each said spaced apart braking surface; and
   (c) each said connecting linkage connecting a lever extension on the front end of said body with a secondary lever on the rear end of said body.

9. The apparatus of claim 1, characterized in that
   (a) the support bracket is U-shaped in cross section.

10. The apparatus of claim 1, further characterized by
    (a) elongated cooperating dovetail surfaces on said support bracket and said braking surfaces for holding said braking surfaces to said support bracket.

* * * * *